United States Patent [19]
Ahmadi et al.

[11] Patent Number: 5,533,026
[45] Date of Patent: Jul. 2, 1996

[54] COMMUNICATION SYSTEM INCLUDING METHOD AND APPARATUS FOR MAINTAINING COMMUNICATIONS WITH A MOBILE TERMINAL

[75] Inventors: Hamid Ahmadi, Somers, N.Y.; Frederic J. Bauchot, Saint-Jeannet; Roselyne Bonnet, Saint Paul, both of France; Ilan Kessler, Haifa, Israel; Arvind Krishna, Briarcliff Manor, N.Y.; Fabien P. Lanne, Valbonne, France; Mahmoud Naghshineh, Fishkill, N.Y.; Catherine Solar, Saint Laurent du Var; Michelle M. Wetterwald, Cagnes Sur Mer, both of France

[73] Assignee: International Business Machines Corporation, Armonk, N.Y.

[21] Appl. No.: 398,717

[22] Filed: Mar. 6, 1995

[51] Int. Cl.$^6$ .............................. H04B 7/24; H04L 12/56
[52] U.S. Cl. ........................................ 370/94.1; 370/95.1
[58] Field of Search ........................... 370/95.1, 95.3, 370/60, 60.1, 94.1, 94.2, 94.3; 455/33.1, 33.2, 53.1, 54.1, 54.2, 56.1; 379/58, 59, 60, 63

[56] References Cited

U.S. PATENT DOCUMENTS

| | | | |
|---|---|---|---|
| 5,095,480 | 3/1992 | Fenner | 370/94.1 |
| 5,359,603 | 10/1994 | McTiffin | 370/94.1 |
| 5,363,371 | 11/1994 | Roy et al. | 370/95.1 |
| 5,371,738 | 12/1994 | Moelard et al. | 370/95.1 |
| 5,410,543 | 4/1995 | Seitz et al. | 370/95.1 |
| 5,412,760 | 5/1995 | Peitz | 370/95.1 |

*Primary Examiner*—Wellington Chin
*Attorney, Agent, or Firm*—Douglas W. Cameron; Jenkens & Gilchrist

[57] ABSTRACT

A communications network having a number of routers, a number of base stations and a number of mobile units maintains communications with the mobile units by assigning a unique address known to the routing entities of the network to each mobile unit. By including the mobile units unique address in topology updates of the network, the location of the mobile unit at any time is made known to all routers of the network. That is, once a mobile unit moves into a domain of a new access point and establishes a new link with the new access point, it uses the topology update mechanism of the network to make its new location known to all routers. Once a router of the network receives topology update information specific to the mobile unit's new location, it updates its routing table such that packets destined to the mobile unit are routed in a path which terminates at the mobile unit and contains its new access point.

14 Claims, 9 Drawing Sheets

FIG. 1B

| ROUTING TABLE OF R101 | | |
|---|---|---|
| DESTINATION ADDRESS | NEXT ROUTER | NEXT NET ID |
| N108 | B104 | N104 |

FIG. 1C

| ROUTING TABLE OF B104 | | |
|---|---|---|
| DESTINATION ADDRESS | NEXT ROUTER | NEXT NET ID |
| N108 | M108 | N108 |

FIG. 1D

| ROUTING TABLE OF B105 | | |
|---|---|---|
| DESTINATION ADDRESS | NEXT ROUTER | NEXT NET ID |
| N108 | B104 | N102 |

FIG. 1E

| ROUTING TABLE OF M108 | | |
|---|---|---|
| DESTINATION ADDRESS | NEXT ROUTER | NEXT NET ID |
| N108 | LOCAL | LOCAL |

FIG. 2B

| ROUTING TABLE OF R101 | | |
|---|---|---|
| DESTINATION ADDRESS | NEXT ROUTER | NEXT NET ID |
| N108 | B105 | N110 |

FIG. 2C

| ROUTING TABLE OF B104 | | |
|---|---|---|
| DESTINATION ADDRESS | NEXT ROUTER | NEXT NET ID |
| N108 | B105 | N102 |

FIG. 2D

| ROUTING TABLE OF B105 | | |
|---|---|---|
| DESTINATION ADDRESS | NEXT ROUTER | NEXT NET ID |
| N108 | M108 | N110 |

FIG. 2E

| ROUTING TABLE OF M108 | | |
|---|---|---|
| DESTINATION ADDRESS | NEXT ROUTER | NEXT NET ID |
| N108 | LOCAL | LOCAL |

NETWORKING STACK

FIG. 4
NETWORK LAYER MODULES
MOBILITY AND ADDRESS TRANSLATION
| TRANSMITTING STATION ADDR. | | DEST. NETWORK ADDR. | |
|---|---|---|---|
NETWORK INTERFACE MODULES
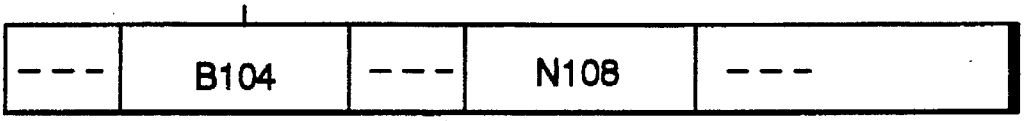
| TRANSMITTING STATION ADDR. | | DEST. NETWORK ADDR. | |
|---|---|---|---|

FIG. 5
NETWORK LAYER MODULES
MOBILITY AND ADDRESS TRANSLATION
NEXT STATION ADDR.    DEST. NETWORK ADDR.
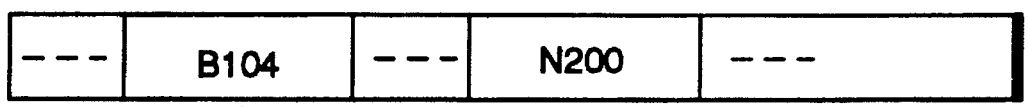
NETWORK INTERFACE MODULES
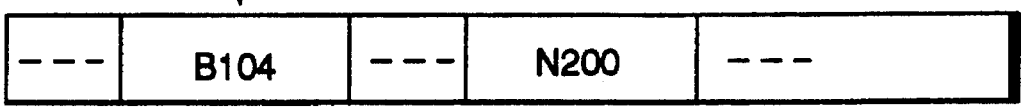
NEXT STATION ADDR.    DEST. NETWORK ADDR.

MOBILITY AND ADDRESS TRANSLATION

COMMUNICATION SYSTEM INCLUDING METHOD AND APPARATUS FOR MAINTAINING COMMUNICATIONS WITH A MOBILE TERMINAL

BACKGROUND OF THE INVENTION

1. Field of the Invention

The present invention relates to communications systems, and more particularly to communications systems including apparatus and method for communicating with mobile terminals as they move from place to place.

2. Prior Art

A communications network generally consists of switching or routing equipment connected together by either wired or wireless links. Network subscribers or user terminals are connected to at least one switch or router in the network by a communications link which, in the case of a wireless terminal, is a wireless link. The communications network transports signals generated by the user terminal to another user terminal connected to the same communications network. In a packet switching network, the user generated signals are presented and contained in packets. The communications between two or more user terminals requires a route to be established between the involved terminals. At connection set-up time, a set of routers or switching points of the communications network is selected. Each of these routers is configured such that when it receives a packet either from another router or from the originating station, the packet is forwarded to an appropriate link connected to another router or to the destination terminal. All such routers which transport packets generated by a user terminal to a destination station and the communications links which connect them constitute a path or a route for that specific set of communicating stations. There exists many routing algorithms which can be used for the route selection and the way a router makes a decision on choosing an appropriate link to forward packets. For many routing protocols such as internet protocol (IP) and network/IPX, routing mechanisms are based on a number of elements such as periodic topology updates which are received by every router. For each packet received, a router chooses an appropriate link to which the packet is forwarded based on a network routing technique which uses the existing topology information as well as the routing information contained in the packet, the network topology is represented in terms of nodes and the links between them. Each node or link is represented by an address. There is a unique relationship between each node of the network and its associated address. By making all routers of a communications network aware of an entity of the communications network by assigning that entity an address, and by including that address in the topology update function, packets destined to that entity will flow through the communications network and each router then forwards the packets to another router which eventually will result in the delivery of such packets to the addressable entity. In general, these addressable entities known to the routers of the network represent a plurality of stations. A network address is assigned to a number of neighboring stations and each station is identified by a second unique address, for example an IP address or a MAC (Media Access Control) address. In one layer of the routing, the packets destined to the station are routed such that they arrive in the domain of all stations all sharing the same network address. Then, based on the specific MAC or intra domain address, the packets are delivered to the final destination.

Without changing the network routing methodology or the network operating system of the user station, the above described methodology fails in a mobile/wireless network. In a mobile/wireless network, the access point and the addressable network domain of a mobile terminal changes as a result of the handoff of a mobile terminal from one access point to another.

One attempt to solve the problem described above is shown in U.S. Pat. No. 5,940,139. The patent describes a method of routing packets through a fixed source routing communications network to and from mobile units. An initial access point is determined when a communication session is established to or from a mobile unit through the network. Location information is updated each time the mobile unit moves out of the range of one access point and into the range of another access point of the network. When packets for the session are to be transmitted to the mobile unit from the wired network, the packets are forwarded from the initial access point to a current access point which by definition is in the range of the mobile units. When packets for the session are to be transmitted from the mobile unit to the wired network, the access point intercepts these packets and routes them to their destination and/or initiates root discovery to those destinations. When packets are to be transmitted between mobile units at different access points, the packets are sent between the current access points and not through home access points.

Although the above identified patent provides a mechanism for routing packets through a fixed source routing communications network to or from a mobile unit, it requires significant overhead in updating location information for each mobile unit as it moves from one access point in the network into the range of another access point of the network.

SUMMARY OF THE INVENTION

Accordingly, it is an object of the present invention to efficiently communicate with mobile units as such mobile units move from domain to domain in a communications network by a system and method which includes assignment of a unique address known to each of the routing entities of the network to each mobile terminal and maintaining routing information based on such unique address in each router of the network such that packets destined to the mobile terminal are delivered by an appropriate link.

Therefore, a communications network having a number of routers, a number of base stations and a number of mobile units maintains communications with the mobile units by assigning a unique address known to the routing entities of the network to each mobile unit. By including the mobile units unique address in topology updates of the network, the location of the mobile unit at any time is made known to all routers of the network. That is, once a mobile unit moves into a domain of a new access point and establishes a new link with the new access point, it uses the topology update mechanism of the network to make its new location known to all routers. Once a router of the network receives topology update information specific to the mobile unit's new location, it updates its routing table such that packets destined to the mobile unit are routed in a path which terminates at the mobile unit and contains its new access point.

Once a mobile unit initiates a connection, a path is selected through the network which transports packets generated by the mobile terminal to its destination. As part of this initiation and connection setup, information is provided to the network operating system of the mobile terminal. This information is used by the network operating system to identify a connection and its parameters. This information also provides some local topology information to the network operation system as well. For example, this information might include the network address of the mobile terminal and the address or identity of the immediate router to be used by the mobile terminal for the purpose of routing.

By using an address translation module, the topology information contained in each packet generated or received by the mobile unit is changed in such a way that from the network operating system point of view, as well as from the point of view of the immediate router, the local topology information remains unchanged. Specifically, the addressing and routing information of packets received by the mobile units are changed to the addressing, routing, and topology information initially learned or used by the mobile units network routing module at connection set-up time. As a result, from the viewpoint of the mobile terminal's network operation system, the mobile terminal remains connected to the same network domain after a handoff (movement from one domain to another) as before the handoff. Also, the address, routing and topology information contained in each packet generated by the network operating system is changed in a way that the immediate router's connected to the mobile terminal remain operational.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 4 is a schematic diagram of transmitting station, destination network addresses at the initiation of a communication in accordance with the present invention.

FIG. 5 is a schematic diagram of a next station and destination network address to be transmitted in accordance with the present invention.

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1A:
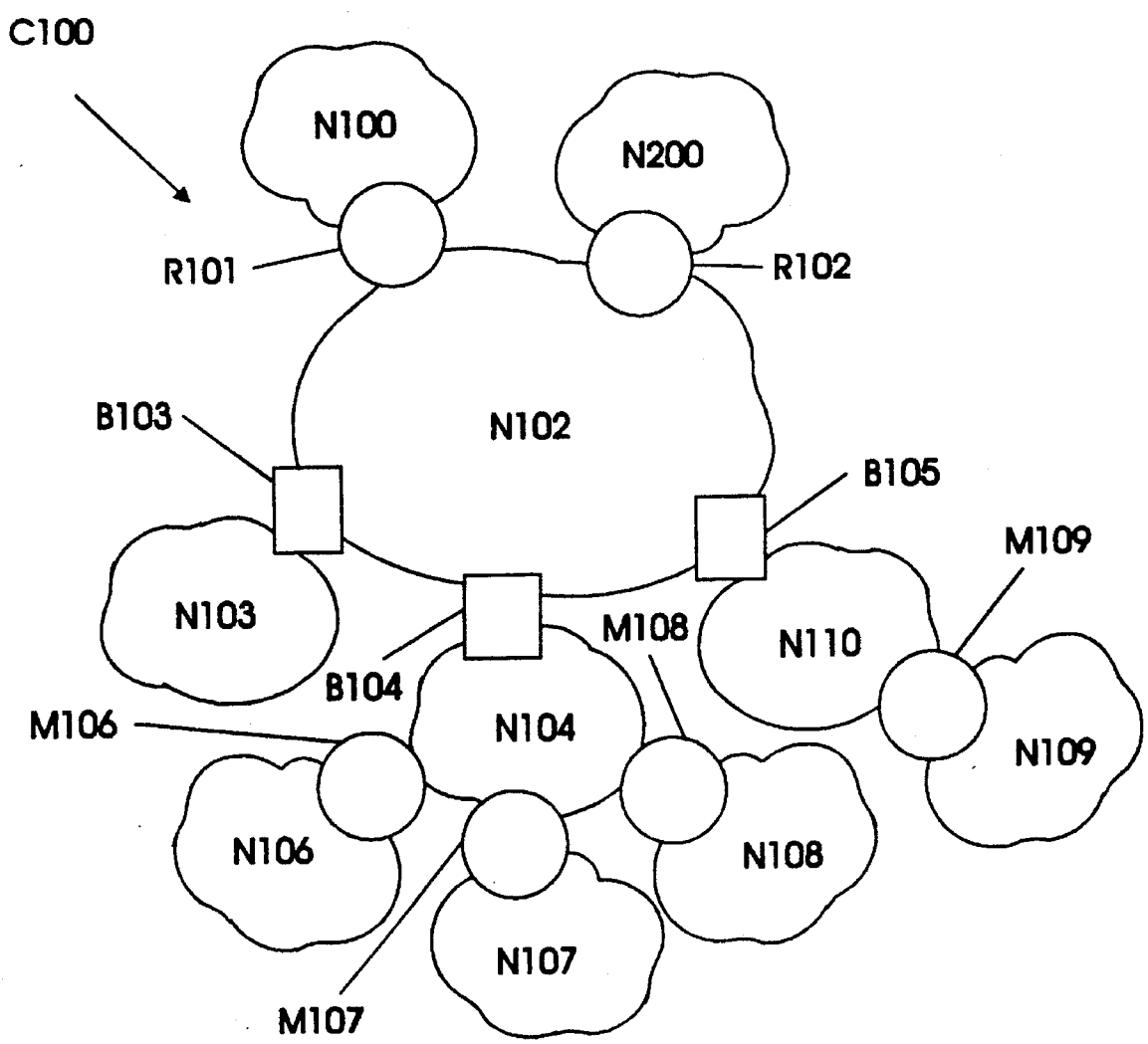
FIG. 1 is a communications network embodying the present invention.
Figure 2A:
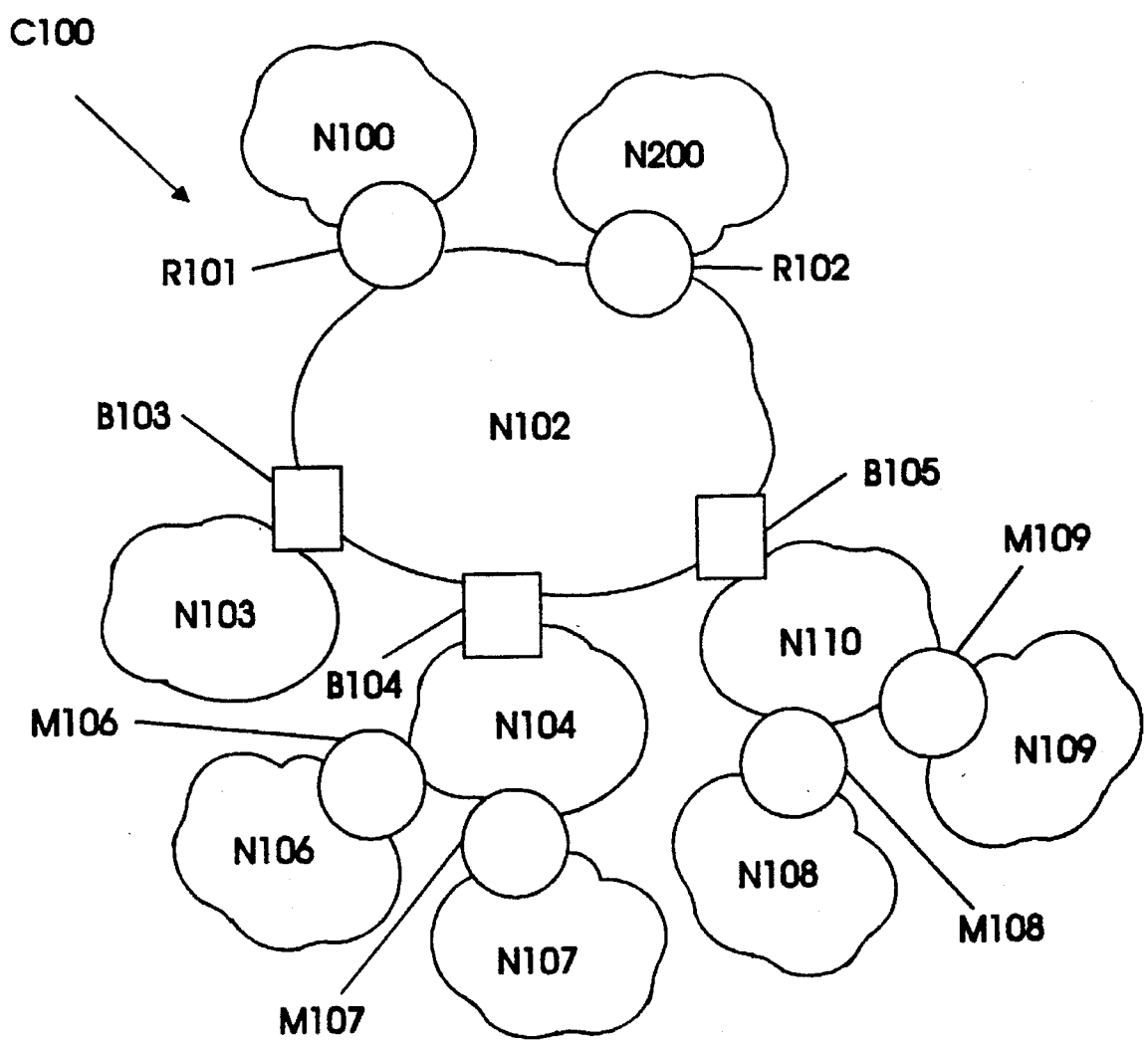
FIG. 2 is a communications network in accordance with the present invention showing a configuration after a mobile unit has moved to a new domain.

Referring now to FIGS. 1 and 2, a preferred embodiment of the present invention will be described. Communications network C100 includes routers R101 and R102 and base stations B103, B104 and B105 connected together by network N102. Base stations B103, B104 and B105 are connected to wired network N102 on one side and to a number of wireless networks such as N103, N104 and N110, respectively, on the other side. Each of the base stations B103, B104 and B105 also acts as a router. Each radio cell is assigned a unique network address such as N103, N104 and N110. Mobile terminals M106, M107, M108 and M109 are each assigned unique network addresses N106, N107, N108 and N109, respectively. Routers R101 and R102, base stations B103, B104 and B105, and mobile terminals M106, M107, M108 and M109 are all commercially available units which are well-known to those skilled in the art. One example of the apparatus employed with the preferred embodiment of the present invention would be for routers, base stations and mobile terminals all to be supplied by International Business Machines Corporation.

It should be noted that in accordance with the present invention, each mobile terminal M106, etc. appears to the rest of the network C100 as a router. Routing tables are also shown in FIG. 1 wherein the next router and the network address of any packet destined to the mobile unit which is assigned the unique address N108 is shown.

When mobile terminal M108 moves from cell N104 to cell N110, the mobile terminal M108 employs a topology update function (sometimes called routing information protocol or RIP) to the network.

As a result, the table entries of all routers in the network are updated such that packets destined to terminal M108 are forwarded and routed correctly.

Referring now to FIG. 2, the updated information is shown after mobile terminal M108 has moved to network N110. Note that the tables have been updated to clearly indicate the routing to mobile terminal M108 which is now in network N110 controlled by base station B105.

Figure 3:
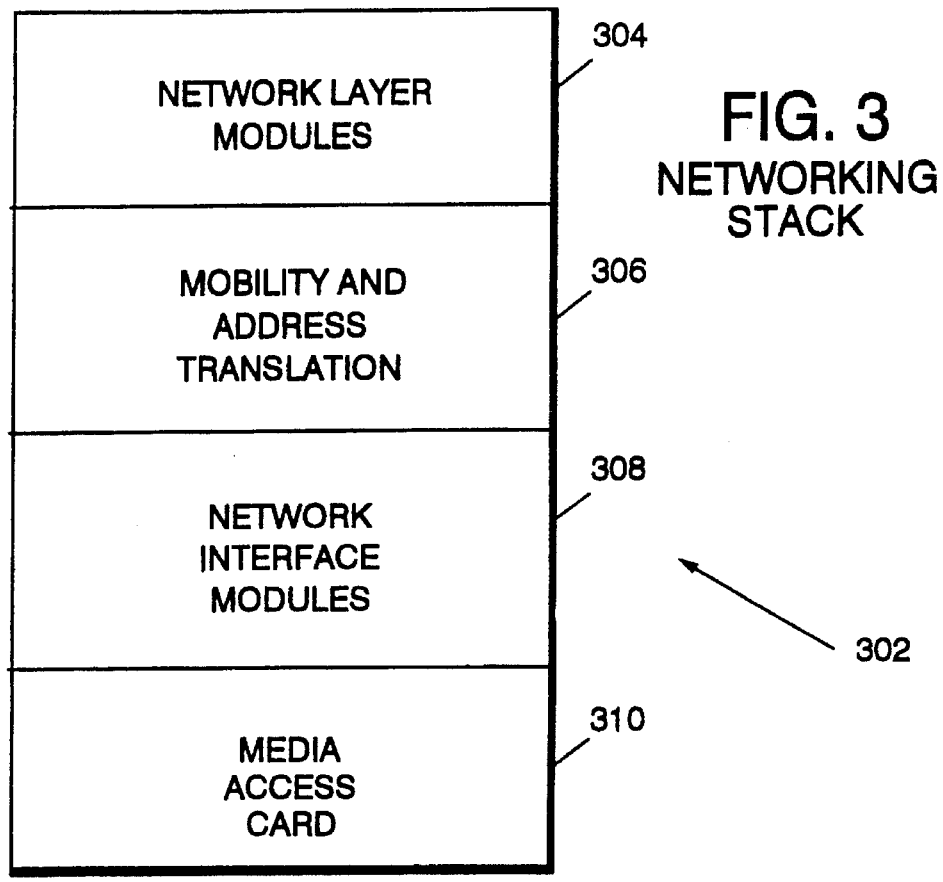
FIG. 3 is a block diagram of the networking stack control in a mobile terminal in accordance with the present invention.

To make the change of location (or handoff) transparent to the mobile terminal's network layer modules 304 (see FIG. 3), the mobile terminal such as M108 has in its networking stack 302 a MOBILITY AND ADDRESS TRANSLATION layer 306 between the network interface 308 and the network layer modules 304. The mobility and address translation layer 306 is the entity that initiates the transmission of topology updating packets (or routing information protocol packets, RIP) after a handoff. Network interface module 308 receives packets from the wireless network media access card 310. These packets are passed through the network layer module 304 to mobility and address translation 306 where the address is resolved. A packet destined to a mobile terminal such as M108 is received by the mobility and address translation module 306 where the address of the transmitting base station such as B105 is determined.

Initially, when mobile terminal M108 starts a connection in radio cell N104, the address of the transmitting station in the packets received at mobility and translation layer 306 through the radio link is base station B104 (see FIG. 4). Further, the address of the next station in packets generated by the mobile terminals network layer 304 which are to be transmitted through the radio link is B104 (see FIG. 5).

Figure 6:
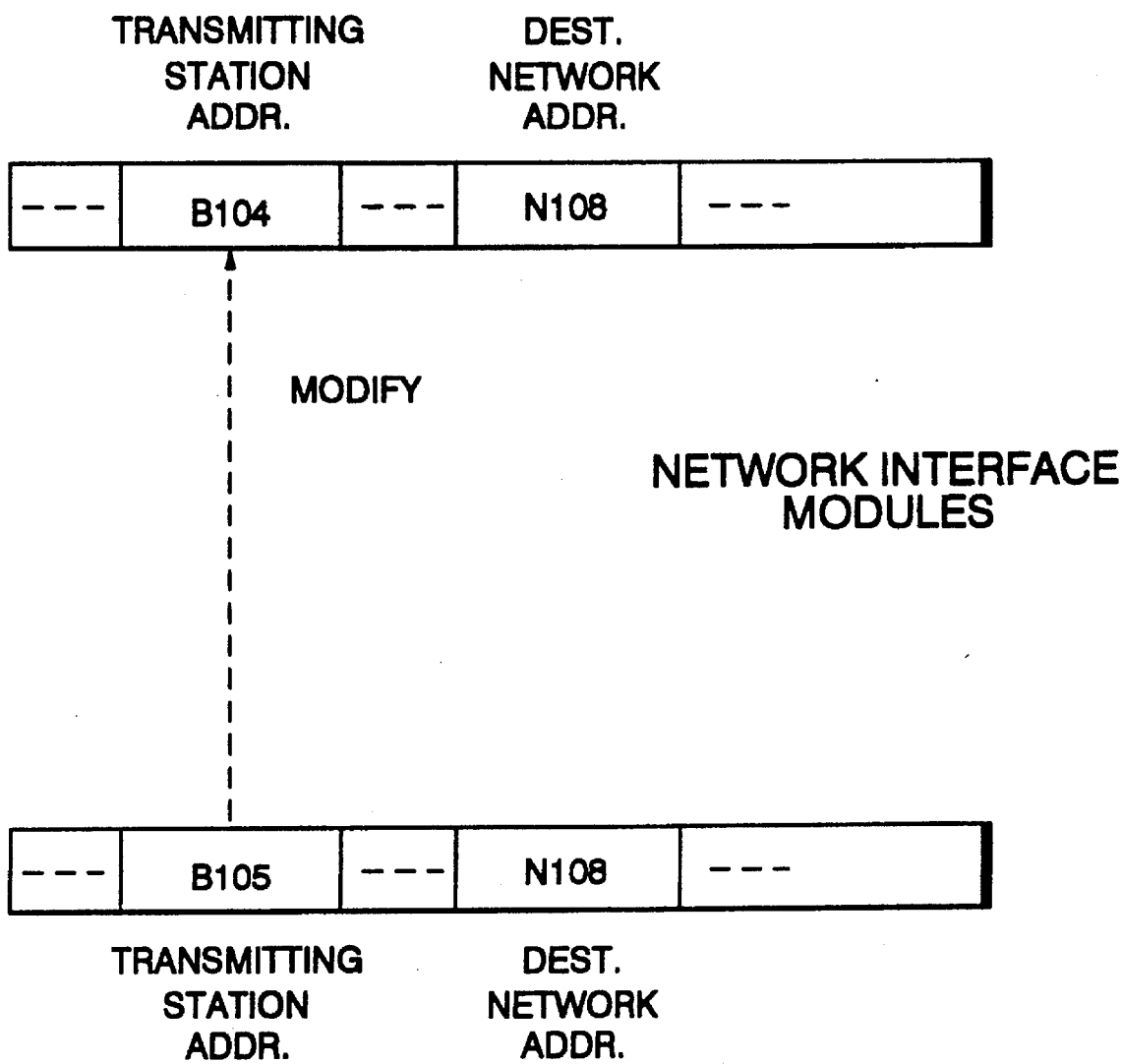
FIG. 6 is a schematic diagram of transmitting station and destination network addresses before and after address translation as a mobile unit moves from one domain to another in accordance with the present invention.

When mobile terminal M108 hands off to base station B105 in radio cell N110, the next transmitting station address in packets received through the radio link are modified by the mobility and address translation layer 306 to base station B105 (see FIG. 6).

As a result, the mobile terminals hand off and change of location remains transparent to the mobile terminal's network layer modules 304.

Figure 7:
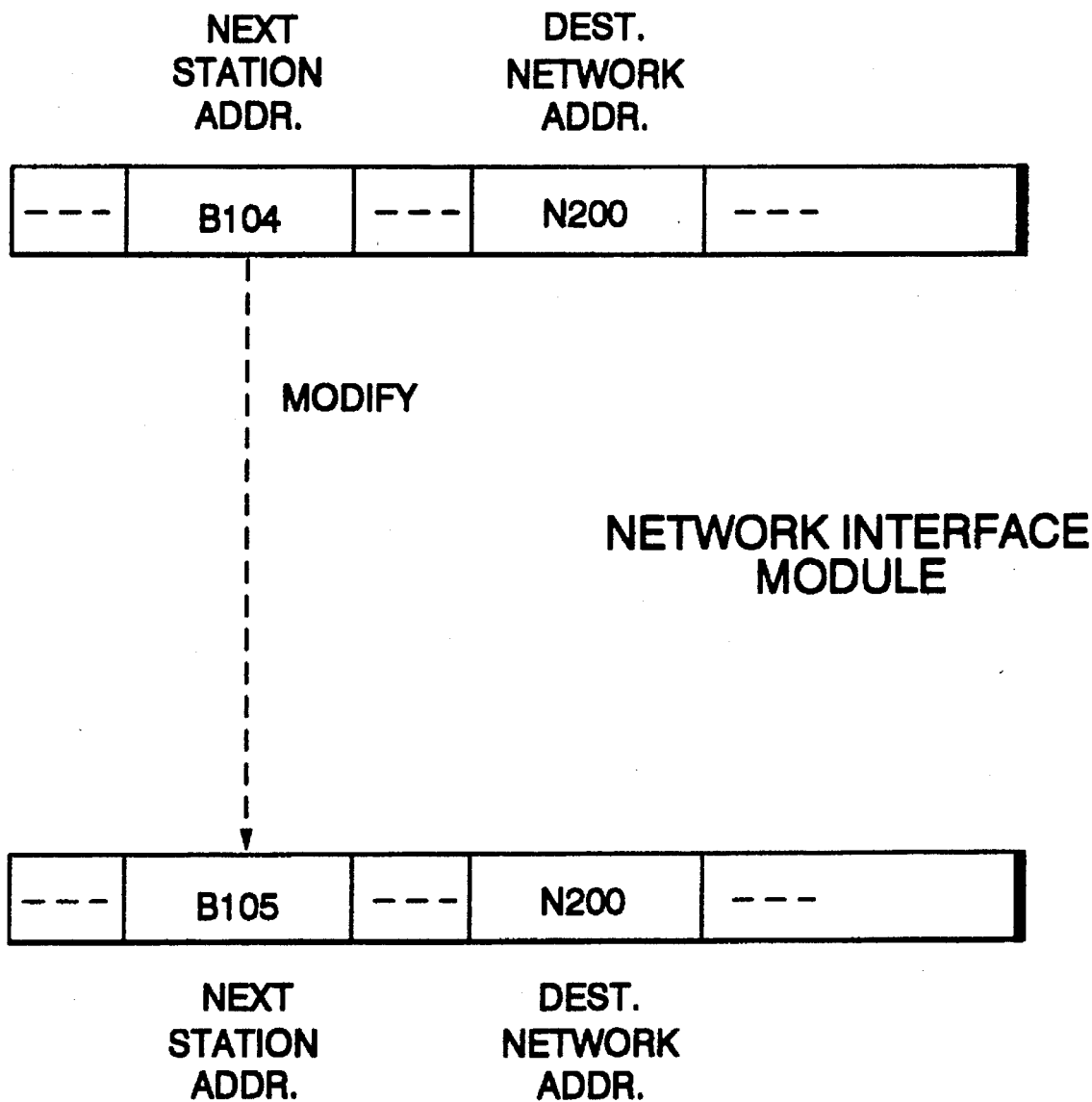
FIG. 7 is a schematic diagram similar to FIG. 6 for a next station and destination network address which has undergone address translation in accordance with the present invention.

In the reverse direction, packets received by the mobility and address translation layer 306 and generated by the mobile terminal's network layer modules 304 are modified such that the address of the next station is B105 rather than B104. This is necessary since the immediate connectivity is transparent to the mobile terminal's network layer module 304 (see FIG. 7). This step insures that packets generated by the mobile terminal M108 are received, processed and routed by the new access point B105.

Figure 8:
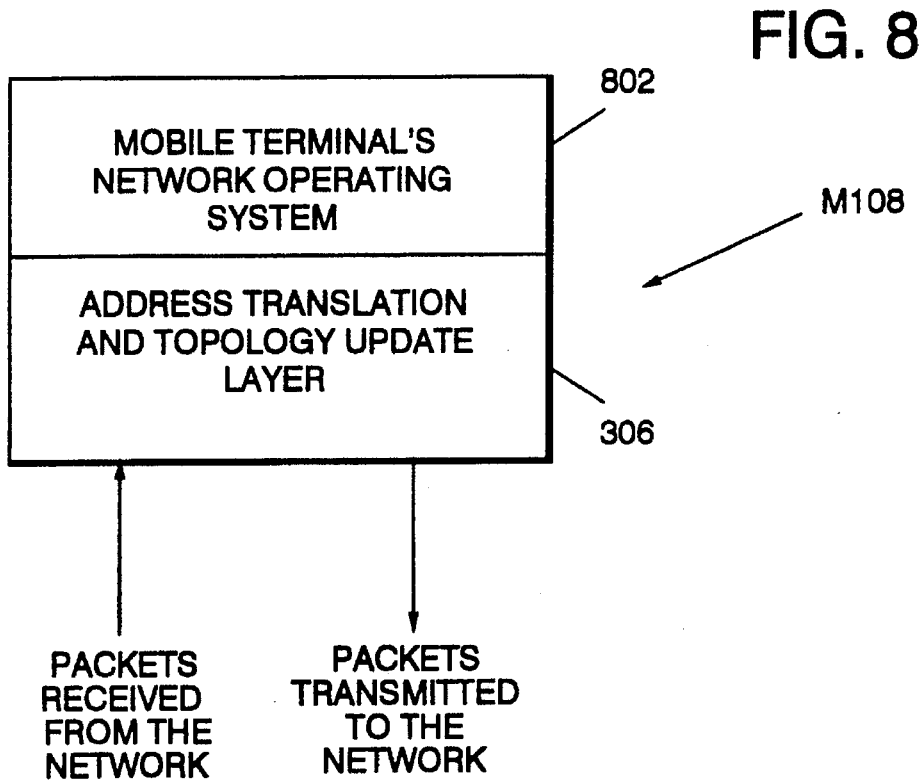
FIG. 8 is a block diagram of network interface functions for each mobile unit in accordance with the present invention.

Referring now to FIG. 8, the topology updating function will be further described. After a hand off from one radio cell to another, mobile terminal M108 updates a topology through the use of address translation and topology update layer 306 under the control of the network operating system 802 in mobile terminal M108.

For this preferred embodiment of the present invention, packets generated by the mobile's higher layer modules which are transmitted to the base station over the wireless link are defined as OUTBOUND packets and packets transmitted by the base station and received from the wireless link by the mobile as INBOUND packets. As described above, the address translation and mobility layer is invoked for every inbound or outbound packet in the mobile terminal. The same function could be implemented and invoked in the base station instead of the mobile terminal. That is, the base station could change the routing and addressing content of all packets destined to a mobile so that after the mobile receives them, they appear to have been received from the network with the unique address assigned for that mobile. Similarly, the routing and addressing content of any packet received by the base station from the wireless link (and transmitted by a mobile) could be changed in such a way that from the point of view of the next router, base station, or switching point, the packet appears to have been received from the network with the address assigned to the wireless cell associated with that base station. In addition, the base station's mobility and address translation could send routing update packets (or RIP packets) in order to update the routing tables of routers in the fixed network on behalf of the mobile. One proficient in the art, could easily implement many alternatives for the address translation and RIP modules. For example, the RIP packet generation module could be implemented in the base station or the mobile. The address translation and mobility functions regarding the INBOUND packets could be performed at the base station or the mobile. Similarly, the address translation and mobility functions regarding the OUTBOUND packets could be performed at the base station or at the mobile. It is not necessary that all of these functions are implemented either in the mobile terminal or the base station. Some functions could be implemented at the base station and some at the mobile terminal. For example, the RIP and the address translation and mobility functions for packets transmitted to the mobile terminal could be implemented in the mobile terminal and the address translation and mobility functions for packets transmitted to the base station (and generated by the mobile terminal) could be implemented at the base station.

The operation of the present invention will now be described in further detail with respect to a specific commercially available network.

Using Netware/IPX supplied by Novell as a means of transport between wireless terminals or between wireless terminal and stations on a wired network allows for seamless mobility in a wireless network such as C100 (see FIG. 1).

Further information regarding Netware/IPX may be found in "Netware Communications Processes", by Paul Turner, System Engineering Division, Novell, Sep. 1990. Copyright Novell 1990.

The method according to the present invention is implemented by the following steps:

(1) Assigning a unique network ID to a mobile terminal;

(2) Assigning a unique network address to any radio cell in the case that the access point or base station is a router;

(3) Replacing the network address in the "giver nearest server" packet with the mobile unique network address such that the IPX entity is always connected to the same IPX network even in the case of handoff;

(4) Replacing the IPX network address in the RIP broadcast packets generated by Netware/IPX agents by the unique mobile address as described above;

(5) Replacing the network address in the "get local target" packet transmitted by the IPX entity of the mobile terminal with the address of the radio cell having the mobile terminal in its domains such that the mobile appears as an IPX client to the nearest IPX router;

(6) Replacing the network address in the "give local target" packet received at the mobile terminal before delivery to the IPX entity of the mobile terminal with the unique mobile address such that the router appears to be on the Netware/IPX network to the mobile terminal;

(7) For normal data transmission, replacing the address in packets generated by the IPX entity of the mobile terminal with the address of the radio cell to which the mobile belongs and replacing the destination address of the nearest router which can be discovered by the "get local target" packet;

(8) Broadcasting RIP packets periodically from the mobile terminal so that the routing information tables in each router in the network are updated in such a way that packets destined to the mobile terminal are forwarded to the next router which will result in the delivery of such packets to the mobile terminal in its current radio cell;

(9) Transmitting a "get local target IPX" packet by the mobile terminal after a handoff event and learning the network address of the new radio cell as well as the address of the router of the new radio cell from the "give local target" packet sent by the nearest router and destined to the mobile terminal;

(10) Broadcasting an RIP packet as described in (8) above after a handoff to update the routing information tables of each router such that packets destined to the mobile terminal are routed through the routers in the network to the correct new radio cell where the mobile terminal resides.

Although the present invention and its advantages have been described in detail, it should be understood that various changes, substitutions and alterations can be made herein without departing from the spirit and scope of the invention as defined by the appended claims.

What is claimed is:

1. A communication network comprising:

a plurality of stations connected together in a first network for transmitting information between users of the network; and a plurality of terminals each communication with at least one of said stations through at least one of a plurality of second networks, each of said terminals having a unique network address, wherein said terminals are mobile terminal capable of being moved from said at least one of said plurality of second networks to another one of said plurality of second networks, wherein said terminals store a second network address of said at least one of said plurality of second networks, and wherein each of said terminals includes an address translation means for translating said second network address of said at least one of the plurality of second networks to a second network address of said another one of said plurality of second networks when said terminal is moved from said at least one of said plurality of second networks to said another one of said plurality of second networks.

2. A communications system according to claim 2 wherein each of said second networks is a wireless communications network.

3. A communications system according to claim 3 wherein each of said terminals is a wireless communications terminal capable of being moved from one of said second networks to another of said second networks.

4. A method for communicating between a plurality of terminals in a communications network, comprising the steps of:

assigning a unique address to each terminal communicating over said communications network;

translating a network address to said unique network identification for a destination mobile terminal;

periodically broadcasting routing information from said mobile terminal such that routing information tables in each router in said network are updated such that packets destined to said mobile terminal are forwarded to a next router for delivery of communications packets to said mobile terminal;

transmitting a packet by said mobile terminal after a handoff event to identify a network address of a new network to which said mobile terminal is connected as well as an address of a router of said new network; and broadcasting a routing information protocol packet after a handoff of a mobile terminal to update routing information tables of each router such that packets destined to said mobile terminal are routed through appropriate routers in said network to said mobile terminal.

5. A method for communicating between a plurality of terminals in a communications network, comprising the steps of:

assigning a unique network address to each mobile terminal in said communications network;

periodically broadcasting routing information such that one or more routing information tables in each of a plurality of routers in said network are updated such that packets destined to said mobile terminal are forwarded to a next router for delivery of communications packets to said mobile terminal;

broadcasting a protocol packet after a handoff of said mobile terminal to update said routing information tables of each said router in said network such that packets destined to said mobile terminal are routed through appropriate routers in said network to said mobile terminal;

changing routing and address information of each said packet destined to said mobile terminal such that said packet appears to have been received from said network with an address uniquely assigned to said mobile terminal; and changing said routing and address information of each packet such that each said packet received at a base station or a next router appears to have been received from said network to which said base station or said router is connected.

6. A method according to claim 5 wherein said step of periodically broadcasting routing information is executed by said mobile terminal.

7. A method according to claim 5 wherein said step of periodically broadcasting routing information is executed by said base station.

8. A method according to claim 5 wherein said step of broadcasting routing information protocol packets after a handoff is executed by said mobile terminal.

9. A method according to claim 5 wherein said step of broadcasting routing information protocol packets after a handoff is executed by said base station.

10. A method according to claim 5 wherein said step of changing routing and address information of each packet is executed by said mobile terminal.

11. A method according to claim 5 wherein said step of changing routing and address information of each packet is executed by said base station.

12. A method according to claim 5 wherein said step of changing said routing and address information of each packet is executed by said mobile terminal.

13. A method according to claim 5 wherein said step of changing said routing and address information of each packet is executed by said base station.

14. A method according to claim 5 wherein said step of periodically broadcasting routing information and said step of broadcasting protocol packet after a handoff are each executed by said base station.

* * * * *

UNITED STATES PATENT AND TRADEMARK OFFICE
CERTIFICATE OF CORRECTION

PATENT NO. : 5,533,026

DATED : July 2, 1996

INVENTOR(S) : Hamid Ahmadi et al.

It is certified that error appears in the above-indentified patent and that said Letters Patent is hereby corrected as shown below:

Column 7, line 25  Replace "2" With --1--

Column 7, line 28  Replace "3" With --2--

Signed and Sealed this

Tenth Day of June, 1997

BRUCE LEHMAN

*Attest:*

*Attesting Officer*  *Commissioner of Patents and Trademarks*